United States Patent
Dao et al.

(10) Patent No.: US 12,079,801 B2
(45) Date of Patent: *Sep. 3, 2024

(54) SYSTEMS AND METHODS FOR MANAGING THIRD PARTY TOKENS AND TRANSACTIONS ACROSS ISSUER ECOSYSTEMS

(71) Applicant: JPMORGAN CHASE BANK, N.A., New York, NY (US)

(72) Inventors: Tuan Dao, Richardson, TX (US); Howard Spector, Street, MD (US); Craig Mullaney, Newark, DE (US); Ayman Hammad, Pleasanton, CA (US); Stanley M. DeVan, Mount Royal, NJ (US); Soumyajit Ghosh, Lewis Center, OH (US); Sangameswara Panchomarthi, Bear, DE (US)

(73) Assignee: JPMORGAN CHASE BANK , N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,371

(22) Filed: Jun. 5, 2023

(65) Prior Publication Data
US 2023/0306411 A1 Sep. 28, 2023

Related U.S. Application Data

(63) Continuation of application No. 16/010,677, filed on Jun. 18, 2018, now Pat. No. 11,727,389.

(51) Int. Cl.
*G06Q 30/0207* (2023.01)
*G06Q 20/32* (2012.01)
(Continued)

(52) U.S. Cl.
CPC ............ *G06Q 20/36* (2013.01); *G06Q 20/322* (2013.01); *G06Q 20/40* (2013.01); *G06Q 30/0215* (2013.01)

(58) Field of Classification Search
CPC ...... G06Q 20/36; G06Q 20/322; G06Q 20/40; G06Q 30/0215
See application file for complete search history.

(56) References Cited

U.S. PATENT DOCUMENTS 10,853,798 B1  12/2020 Maeng et al.
10,984,411 B1  4/2021 Hayes et al.
(Continued)

OTHER PUBLICATIONS

International Search Report, dated Sep. 3, 2019, from corresponding International Application No. PCT/US2019/037422.
(Continued)

*Primary Examiner* — Azam A Ansari
(74) *Attorney, Agent, or Firm* — GREENBERG TRAURIG LLP (57) ABSTRACT

System and methods for managing third party tokens and transaction across issuer ecosystems are disclosed. In one embodiment, in an information processing device comprising at least one computer processor, a method for managing payment tokens may include: (1) a first computer program associated with a financial institution and executed by the information processing device accessing a payment token associated with a second computer program executed by the information processing device; (2) the first computer program identifying the payment token as associated with a financial instrument issued by the financial institution; (3) a backend for the financial institution generating an association between the payment token and the financial institution; and (4) the backend for the financial institution communicating the association to an authorization platform for the financial institution.

7 Claims, 4 Drawing Sheets

(51) Int. Cl.
*G06Q 20/36* (2012.01)
*G06Q 20/40* (2012.01)

(56) References Cited

U.S. PATENT DOCUMENTS

| | | |
|---|---|---|
| 2012/0197794 A1 | 8/2012 | Grigg et al. |
| 2013/0191227 A1 | 7/2013 | Pasa et al. |
| 2014/0344149 A1 | 11/2014 | Campos |
| 2015/0032627 A1 | 1/2015 | Dill et al. |
| 2015/0112870 A1* | 4/2015 | Nagasundaram .... G06Q 20/385 705/67 |
| 2015/0302398 A1 | 10/2015 | Desai et al. |
| 2015/0332264 A1* | 11/2015 | Bondesen .......... G06Q 20/3821 705/44 |
| 2017/0091759 A1* | 3/2017 | Selfridge ............. G06Q 20/385 |
| 2017/0161733 A1 | 6/2017 | Koletsky et al. |
| 2017/0185997 A9 | 6/2017 | D'Alisa et al. |
| 2017/0345105 A1 | 11/2017 | Isaacson et al. |
| 2018/0101857 A1* | 4/2018 | Deliwala ............ G06Q 30/0226 |
| 2018/0293573 A1 | 10/2018 | Ortiz |

OTHER PUBLICATIONS

Written Opinion of the International Searching Authority, dated Sep. 3, 2019, from corresponding International Application No. PCT/US2019/037422.

* cited by examiner

SYSTEMS AND METHODS FOR MANAGING THIRD PARTY TOKENS AND TRANSACTIONS ACROSS ISSUER ECOSYSTEMS

RELATED APPLICATIONS

This application is a Continuation of U.S. patent application Ser. No. 16/010,677, filed Jun. 18, 2021, now U.S. Pat. No. 11,727,389, the disclosure of which is hereby incorporated, by reference, in its entirety.

FIELD OF THE INVENTION

The present disclosure generally relates to systems and methods for managing third party tokens and transaction across issuer ecosystems.

DESCRIPTION OF THE RELATED ART

A financial instrument issuer's electronic wallet (e.g., Chase Bank's Chase Pay application) may be "connected" to a third party electronic wallet, such as Apple Pay, Samsung Pay, and Android Pay, on the same mobile electronic device. This is often referred to as a "wallet-in-wallet" arrangement. A user may use the issuer's electronic wallet to provision credit or debit cards issued by the issuer into the third party electronic wallet. The resulting digital tokens carry an identifier, such as the "Token Request ID," or "TRID," that is associated with that third party electronic wallet provider. This identifier remains the same regardless of whether the third party electronic wallet is "connected" with the issuer's electronic wallet.

When, however, the issuer wants to enable benefits to those third party tokens in the wallet-in-wallet situation, the issuer cannot use the identifier to determine if a transaction using such a token would qualify for the intended benefits.

SUMMARY OF THE INVENTION

System and methods for managing third party tokens and transaction across issuer ecosystems are disclosed. In one embodiment, in an information processing device comprising at least one computer processor, a method for managing payment tokens may include: (1) a first computer program associated with a financial institution and executed by the information processing device accessing a payment token associated with a second computer program executed by the information processing device; (2) the first computer program identifying the payment token as associated with a financial instrument issued by the financial institution; (3) a backend for the financial institution generating an association between the payment token and the financial institution; and (4) the backend for the financial institution communicating the association to an authorization platform for the financial institution.

In one embodiment, the first computer program may include an electronic wallet application, and the second computer program may include a third party payment application.

In one embodiment, the information processing device may include a mobile electronic device.

In one embodiment, the method may further include the first computer program receiving approval to access the payment token associated with the second computer program.

In one embodiment, the step of generating an association between the payment token and the financial institution may include setting a token wallet characteristics for the payment token to indicate the association.

According to another embodiment, in an information processing device comprising at least one computer processor, a method for managing payment tokens may include: (1) receiving, from a first computer program executed on a mobile electronic device, a request to provision a payment token for a financial instrument issued by a financial institution to a second computer program; (2) generating the payment token for the financial instrument; (3) generating an association between the payment token and the financial institution; and (4) communicating the association to an authorization platform for the financial institution.

In one embodiment, the method may further include communicating the payment token to the second computer program. The payment token may be communicated to the second computer program via the first computer program.

In one embodiment, the first computer program may include an electronic wallet application, and the second computer program may include a third party payment application.

In one embodiment, the information processing device may include a backend for the financial institution.

In one embodiment, the step of generating an association between the payment token and the financial institution may include setting a token wallet characteristics for the payment token to indicate the association.

In one embodiment, the method may further include setting a transaction treatment characteristics indicator for the payment token to indicate the association.

According to another embodiment, in an information processing device comprising at least one computer processor, a method for managing payment tokens may include: (1) receiving, from a point of transaction device, a transaction comprising a payment token, the transaction conducted using a third party computer application; (2) determining that the payment token is associated with a financial institution; and (3) conducting the transaction as a transaction conducted using an electronic wallet for the financial institution.

In one embodiment, the information processing device may include an authorization platform for the financial institution.

In one embodiment, the third party computer application may include a third party payment application.

In one embodiment, the payment token is associated with a financial institution when a token wallet characteristics for the payment token indicates an association between the payment token and the financial institution.

In one embodiment, the step of conducting transaction as a transaction conducted using an electronic wallet for the financial institution may include applying a benefit that is issued to transactions using the electronic wallet for the financial institution to the transaction. The benefit may be a discount, issuance of rewards, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for managing third party tokens and transaction across issuer ecosystems are disclosed.

A payment has several attributes, including an identification of the issuer of the financial instrument from which the token is created, and an identification of the token requestor that is requesting the creation of the token (i.e., the Token Requestor ID, or "TRID"). In embodiments, an issuer may wish to associate a token requested by a third party for a third party wallet with some or all of the features and benefits that tokens requested by the issuer may enjoy.

In embodiments, an issuer of a financial institution may identify and save characteristics, such as "Token Wallet Characteristics," or "TWC," of a third party token when the issuer electronic wallet is connected to the third party electronic wallet. The issuer may distribute the characteristics to its authorization platform(s) to identify transactions that use the third party tokens. The issuer's authorization platforms may augment the transaction authorization records with transaction characteristics, for example, a "Transaction Treatment Characteristics," or "TTC") by applying the issuer's intended business rules for any benefit that the third party transactions are qualified, such as rewards, discounts, etc. The issuer's authorization platforms may propagate the transaction characteristics (e.g., the TTC) downstream to its fraud, servicing, and/or operation systems to perform or apply corresponding treatment to a transaction involving the third party token as specified by, for example, the issuer's business rules.

In embodiments, the TTC and/or TWC may be added to the transaction authorization records, which may then be propagated downstream for servicing and operation purposes in case of dispute, fraud claims, etc. Thus, downstream applications and customer service representatives have this information to support cardholders appropriately.

Embodiments provide the ability for the issuer to manage third party tokens and associated transactions, and provide centralized and/or synchronized methods for applying token characteristics to transaction characteristics. Embodiments may accomplish this without requiring a change to the design or behavior of the third party wallet. Embodiments may further segregate token characteristics from transaction characteristics.

Figure 1:
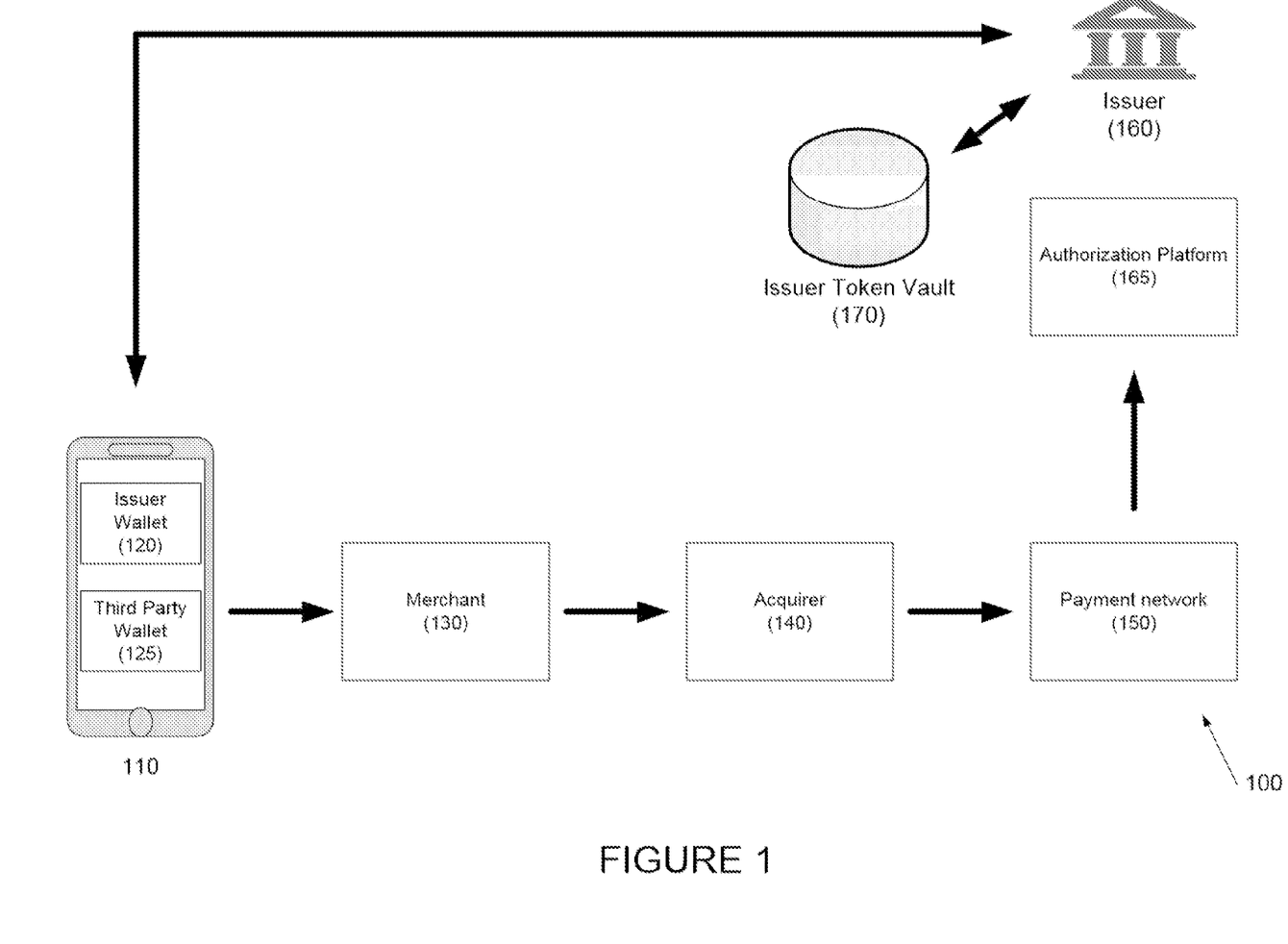
FIG. 1 depicts a system for managing third party tokens and transaction across issuer ecosystems according to one embodiment.

Referring to FIG. 1, a system for managing third party tokens and transaction across issuer ecosystems is disclosed. System 100 may include mobile electronic device 110, which may be any suitable mobile electronic device. Examples include smart phones, smart watches, tablet computers, notebook computers, Internet of Things (IoT) appliances, etc.

Mobile electronic device 110 may include one or more computer processors that may execute one or more computer programs, or applications. In one embodiment, mobile electronic device 110 may execute issuer electronic wallet 120, which may be provided by financial instrument issuer 160, and third party electronic wallet 125, which may be provided by a third party.

System 100 may further include issuer 160, merchant 130, acquirer 140, and payment network 150. Issuer 160 may issue a financial instrument that may provisioned for third party electronic wallet 125. The financial instrument may also be provisioned in issuer electronic wallet 120.

Issuer 160 may further include authorization platform(s) 165 that may authorize transactions received from payment network 150.

In one embodiment, a financial instrument may be provisioned to third party electronic wallet 125 independent of issuer 160; for example, a user may enter a credit card number, or capture an image of a credit card, and the third party electronic wallet 125 may request a token for the credit card. Payment network 150 may generate and provide the token to third party electronic wallet 125.

In another embodiment, a third party token provider (not shown) may generate the token.

When a token is requested by third party electronic wallet 125, issuer 160 may not associate that token with the features or benefits that a token in issuer electronic wallet 120 may enjoy. Thus, in embodiments, when the user connects, or links, issuer electronic wallet 120 with third party electronic wallet 125, logic (e.g., logic in issuer electronic wallet 120) may identify tokens in third party electronic wallet 125 that were requested by the third party and are based on financial instruments issued by issuer 160. Issuer 160 may then associate the token(s) with issuer 160 and may store this association in a database, such as a token vault 170. Issuer 160 may further provide the association to its authorization platform(s) 165.

In another embodiment, the token may be "pushed" from issuer electronic wallet 120 to third party electronic wallet 125. When the token is pushed, issuer 160 may then identify the token as being associated with issuer 160 and store this association in a database (not shown). Issuer 160 may further provide the association to its authorization platform (s) 165.

Merchant 130 may be any suitable provider of a good or service, including both brick and mortar and on-line merchants.

Acquirer 140 may communicate with issuer 110 using, for example, payment network 150. In one embodiment, acquirer 140 may be associated with, or part of, issuer 110.

Figure 2:
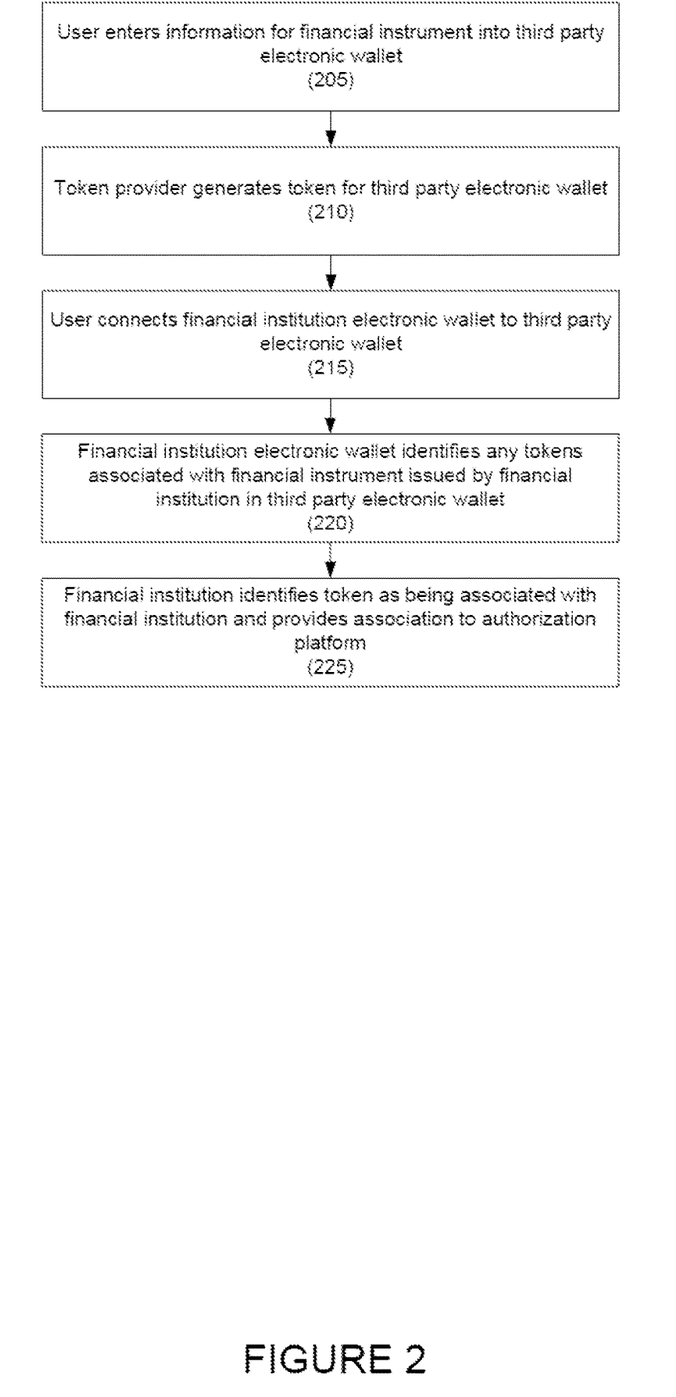
FIG. 2 depicts a method for managing third party tokens and transaction across issuer ecosystems according to one embodiment.

Referring to FIG. 2, a method for managing third party tokens and transactions across financial institution ecosystems is disclosed according to one embodiment.

In step 205, a user may enter information for a financial instrument into a third party electronic wallet. For example, a user may type in a credit card number, take an image of a credit card, etc. Any suitable manner of providing financial instrument information may be used as is necessary and/or desired.

In step 210, a token provider, such as a payment association, a third party token provider, the issuer, or any other suitable entity may generate a token for the third party electronic wallet.

In step 215, the user may connect the financial institution's electronic wallet to the third party electronic wallet. For example, an option may be provided in the financial institution's electronic wallet to connect to the third party electronic wallet.

In step 220, the financial institution electronic wallet or the financial institution may identify any token(s) in the third party electronic wallet that are based on financial instruments that are issued by the financial institution. In one embodiment, the financial institution's electronic wallet may access each token stored in the third party electronic wallet, and a back end for the financial institution may determine whether any tokens are associated with the financial institution.

In one embodiment, security may be provided by the third party electronic wallet, and the third party electronic wallet may only identify tokens based on financial instruments issued by the financial institution in question, and not those from other financial institutions. For example, the financial institution electronic wallet may compare tokens in the third party electronic wallet against the tokens from the financial institution's token vault, belonging to the logged-in user. If a third party token is identified as being associated with the financial institution, the financial institution's electronic wallet may associate the token therewith, and inform the financial institution's token vault of the association.

In step 225, once the financial institution electronic wallet or the financial institution identifies a token as being associated with a financial instrument that is issued by the financial institution, the financial institution electronic wallet or the financial institution may associate the token with the financial institution, and may provide the association to the financial institution's authorization platform(s). For example, the financial institution may identify the token as being equivalent to tokens generated for, or provisioned to, the financial institution's electronic wallet. In one embodiment, the TWC for the token may be set to indicate as such.

Other characteristics, such as the TTC for the token, may be set as well.

When a transaction is conducted using the token, the financial institution's authorization platform(s) will identify the token as being associated with the financial institution and may process the transaction in the same manner as it would a token from the financial institution's electronic wallet. For example, the association identified by the authorization platform may be used as a parameter in determining eligibility for benefits for the transaction.

Figure 3:
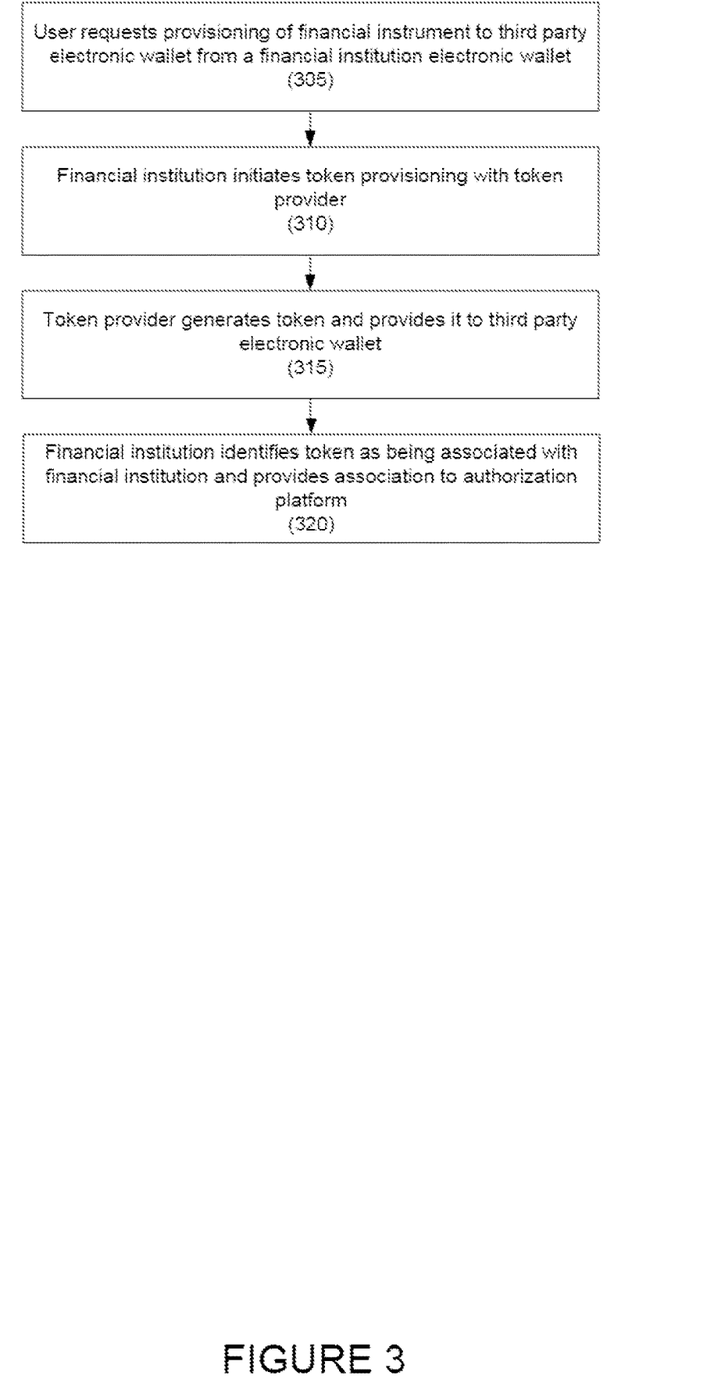
FIG. 3 depicts a method for managing third party tokens and transaction across issuer ecosystems according to another embodiment.

Referring to FIG. 3, a method for managing third party tokens and transactions across financial institution ecosystems is disclosed according to one embodiment.

In step 305, a user may request provisioning of a financial instrument to a third party electronic wallet using a financial institution electronic wallet. The user may, for example, use push provisioning or in-app provisioning for this process.

In one embodiment, while using the financial institution's electronic wallet, the user may identify a financial instrument and a third party wallet, and may request that the financial institution provision and push a token to the third party electronic wallet.

In step 310, the financial institution may initiate provisioning of a token with a token provider (e.g., payment association, third party token provider, the issuer, etc.).

In step 315, the token provider may generate the token. The token provider may provide the token to the third party electronic wallet directly, may provide the token to the third party electronic wallet backend to provide to the third party electronic wallet.

In step 320, the financial institution may identify the token as being associated with the issuer, and may provide the association to its authorization platform(s). For example, the financial institution may identify the token as being equivalent to tokens generated for, or provisioned to, the financial institution's electronic wallet. In one embodiment, the TWC for the token may be set to indicate such.

When a transaction is conducted using the token, the financial institution's authorization platform(s) will identify the token as being associated with the financial institution and may process the transaction in the same manner as it would a token from the financial institution's electronic wallet. For example, the issuer may use the association as a parameter in determining eligibility of benefits for the transaction.

Figure 4:
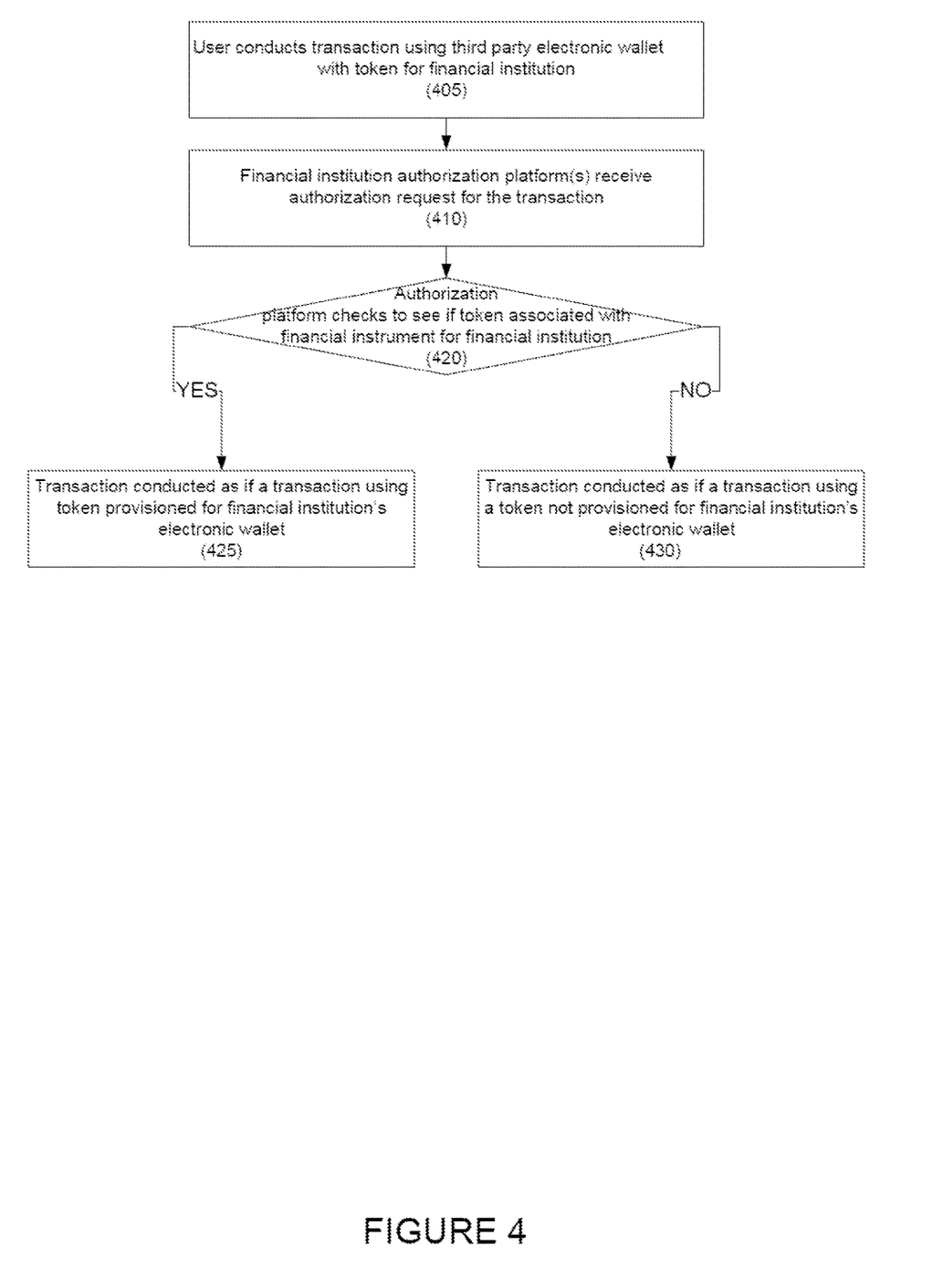
FIG. 4 depicts a method for conducting a transaction across issuer ecosystems according to another embodiment.

Referring to FIG. 4, a method for conducting a transaction across issuer ecosystems is disclosed according to another embodiment.

In step 405, a user may conduct a transaction using a third party wallet with a token for a financial institution that was provisioned to the third party wallet. In one embodiment, the token may be identified as being associated with the financial institution using, for example, the method of FIG. 2 or 3, or any other suitable method.

In step 410, the financial institution's authorization platform may receive an authorization request for the transaction from the merchant. In one embodiment, the transaction may include the token and any other relevant information.

In step 415, the authorization platform may check a database (e.g., a token vault) to determine if the token is associated with the financial institution. For example, the authorization platform may check the TWC for the token to determine if the token is flagged as having the association.

In step 420, if the token is flagged, in step 425, the transaction may proceed in a manner similar to using a token provisioned for the financial institution's electronic wallet, and the issuer may use the association as a parameter in determining eligibility of benefits for the transaction. For example, rewards, discounts, etc. may be applied to the transaction, and benefits may be provided to the merchant.

If the token is not flagged as associated with the financial institution, in step 430, the transaction may proceed without the rewards, discounts, or benefits.

Although multiple embodiments have been disclosed, it should be recognized that these embodiments are not exclusive, and aspects and features from one embodiment may be used with other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for managing payment tokens, comprising:
receiving, by an electronic device for a financial institution and from a financial institution electronic wallet application executed on a mobile electronic device, a request to provision a payment token for a financial instrument issued by a financial institution to a third-party electronic wallet application also executed by the mobile electronic device, wherein the financial institution electronic wallet application and the third-party electronic wallet application are configured to store provisioned payment tokens for associated credit cards or debit cards and are configured to conduct mobile payment transactions;
generating, by the electronic device and in response to receiving the request, the payment token for the financial instrument;
provisioning, by the financial institution electronic wallet application, the payment token to the third-party electronic wallet application;
receiving, by the financial institution electronic wallet application, approval to access the third-party electronic wallet application;
accessing, by the financial institution electronic wallet application and in response to the approval, the third-party electronic wallet application;
identifying, by the financial institution electronic wallet application, the payment token in the third-party electronic wallet application as issued by the financial institution and provisioned to the third-party electronic wallet application by the financial institution electronic wallet application;
setting a token wallet characteristic indicator for the payment token that indicates that the payment token is for an account issued by the financial institution;
communicating the payment token with the token wallet characteristic indicator to a token vault;
distributing the token wallet characteristic indicator to an authorization platform for the financial institution wherein the distributing includes adding the token wallet characteristic indicator to a transaction record; and
communicating, by the electronic device, an association between the payment token and the financial institution to an authorization platform for the financial institution;
wherein the authorization platform is configured to conduct a transaction from the third-party electronic wallet application with the payment token with the same benefits as if the transaction had originated from the financial institution electronic wallet application based on the token wallet characteristic indicator.

2. The method of claim 1, further comprising:
communicating, by the electronic device, the payment token to the third-party electronic wallet application.

3. The method of claim 2, wherein the payment token is communicated to the third-party electronic wallet application via the financial institution electronic wallet application.

4. A method for managing payment tokens, comprising:
receiving, by an authorization platform computer program for an authorization program for a financial institution and from a point of transaction device, a transaction comprising a payment token, the transaction conducted using a third-party electronic wallet application executed by a mobile electronic device;
retrieving, from a token vault, a token wallet characteristic indicator for the token;

determining, by the authorization platform computer program, that the payment token is associated with a financial institution based on the token wallet characteristic indicator, wherein the payment token is generated by a electronic device for a financial institution in response to receiving a request from a financial institution electronic wallet application to provision the payment token to the third-party wallet application and provisioned to the third-party wallet application by the electronic device, wherein the financial institution electronic wallet application is configured to receive approval to access the third-party electronic wallet application, to access the third-party electronic wallet application in response to the approval and to identify the payment token in the third-party electronic wallet application as issued by the financial institution and provisioned to the third-party electronic wallet application by the financial institution electronic wallet application;

adding, by the authorization platform computer program, the token wallet characteristic indicator to a transaction record for the transaction; and conducting, by the authorization platform computer program, the transaction as if the transaction had originated from a financial institution electronic wallet application for the financial institution;

wherein the financial institution electronic wallet application and the third-party electronic wallet application are configured to store provisioned payment tokens for associated credit cards or debit cards and are configured to conduct mobile payment transactions.

5. The method of claim 4, wherein the step of conducting transaction as a transaction conducted using an electronic wallet for the financial institution comprises applying a benefit that is issued to transactions using the electronic wallet for the financial institution to the transaction.

6. The method of claim 5, wherein the benefit is a discount or an issuance of reward points.

7. The method of claim 4, wherein the financial institution conducts the transaction in an alternate currency.

* * * * *